US010743452B2

(12) United States Patent
Ihde

(10) Patent No.: US 10,743,452 B2
(45) Date of Patent: Aug. 18, 2020

(54) STRIP TILLAGE DEVICE

(71) Applicant: Chad Ihde, Dayton, MN (US)

(72) Inventor: Chad Ihde, Dayton, MN (US)

(73) Assignee: Chad Ihde, Dayton, MN (US)

( * ) Notice: Subject to any disclaimer, the term of this patent is extended or adjusted under 35 U.S.C. 154(b) by 478 days.

(21) Appl. No.: 15/425,188

(22) Filed: Feb. 6, 2017

(65) Prior Publication Data

US 2018/0220573 A1   Aug. 9, 2018

(51) Int. Cl.
*A01B 13/08* (2006.01)

(52) U.S. Cl.
CPC .................... *A01B 13/08* (2013.01)

(58) Field of Classification Search
CPC .............. A01B 13/08; A01B 15/025
USPC ........ 172/699, 700, 722, 723, 724; 111/123, 111/124, 125
See application file for complete search history.

(56) References Cited

U.S. PATENT DOCUMENTS

| | | | |
|---|---|---|---|
| 19,878 A | 4/1858 | Scoville | |
| 539,289 A * | 5/1895 | McWhinney | A01B 15/025 172/700 |
| 1,314,394 A * | 8/1919 | Grimes | A01D 29/00 171/83 |
| 1,381,028 A * | 6/1921 | Stevenson | A01B 41/00 172/724 |
| 2,569,556 A * | 10/1951 | Collins et al. | A01B 15/025 172/382 |
| 2,874,656 A * | 2/1959 | Bennett | A01C 23/025 111/123 |
| 3,038,424 A * | 6/1962 | Johnson | A01C 23/025 111/124 |
| 3,180,430 A * | 4/1965 | Launder et al. | A01B 13/08 172/700 |
| 4,077,479 A * | 3/1978 | Tibbs | A01B 39/20 172/509 |
| 4,102,407 A * | 7/1978 | Danszky et al. | A01B 13/08 172/611 |
| 4,825,782 A * | 5/1989 | Mikkelsen | A01B 35/26 111/123 |
| 6,276,463 B1 | 8/2001 | Hollimon et al. | |
| 6,702,036 B1 * | 3/2004 | Tatarliov | A01B 35/22 172/724 |
| 7,568,439 B2 * | 8/2009 | Steinlage et al. | A01B 15/025 111/123 |
| 7,770,657 B2 | 8/2010 | Poutre | |
| 2012/0111588 A1 | 5/2012 | Smith et al. | |

FOREIGN PATENT DOCUMENTS

FR      2682258 A1    4/1993

* cited by examiner

*Primary Examiner* — Thomas B Will
*Assistant Examiner* — Joel F. Mitchell
(74) *Attorney, Agent, or Firm* — Schwegman Lundberg & Woessner, P.A.

(57) ABSTRACT

A tillage device includes a soil disruptor configured to couple to an agricultural implement. The soil disruptor is sized and shaped to create a soil disruption in a target soil profile beneath a soil surface without tilling the soil surface when the soil disruptor is moved through the target soil profile by the agricultural implement.

19 Claims, 5 Drawing Sheets

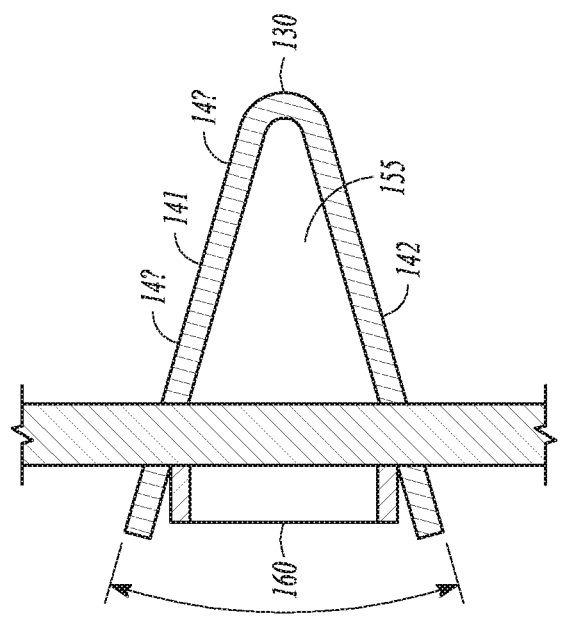
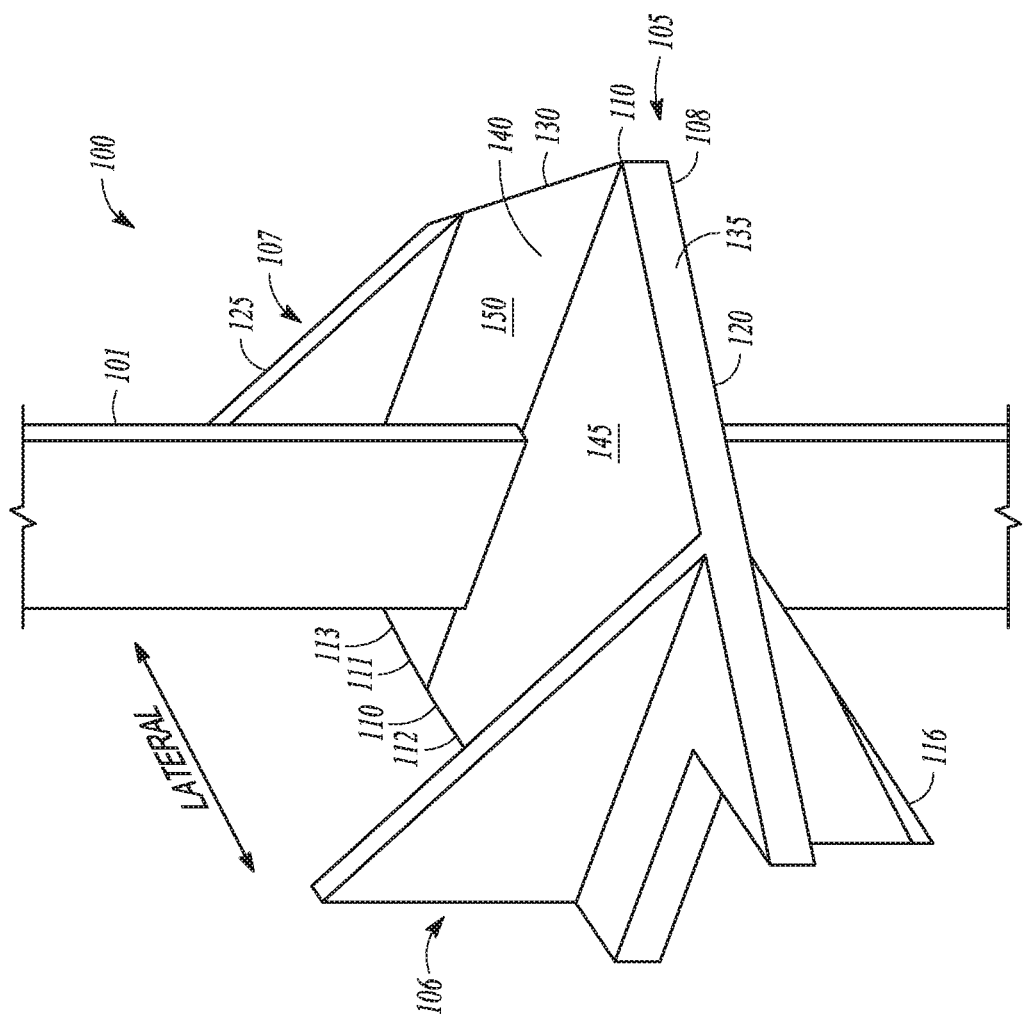
FIG. 1B
FIG. 1A

STRIP TILLAGE DEVICE

BACKGROUND

To grow crops, it is important to have conditions that are conducive to plant development, both above and below the soil. For example, water, sun, and nutrients support healthy plant development.

Below the soil, it is important that conditions are conducive to plant root development. Hard, compacted soil can reduce or disrupt the growth of healthy roots.

To promote root development, a field may be plowed to loosen soil and attempt to remove compaction. However, plowing can create erosion, nutrient loss, release moisture and carbon dioxide from the soil. This release can compromise soil health, both short and long term, which can reduce productiveness and profitability of the soil plant development.

Strip tillage techniques have been developed that can reduce the volume of moisture, carbon dioxide or residue lost during plowing. Strip tillage involves one trip across the field plowing strips of land, as opposed to the entire field. Conventional and conservation tillage is currently a two-step process. For example, a field may first be plowed with a chisel plow, and then cultivated with a field cultivator. Both conventional and conservation tillage is a two pass system that exposes disturbed soil, creating a potentially high erosion environment as compared to strip tillage.

OVERVIEW

The present inventor has recognized, among other things, that a problem to be solved can include a need to till soil in a root zone beneath a soil surface while avoiding significant disruption of the soil surface. Tilling of soil in a rooting zone and avoidance or reduction of soil compaction can promote nutrient uptake, root production, and root growth, but tilling of soil at the surface can create undesirable effects such as erosion, nutrient loss, and release moisture and carbon dioxide from the soil. The present subject matter can help provide a solution to this problem, such as by providing a device that is sized and shaped to create a sub-surface soil disruption in a rooting zone while avoiding significant disruption of the soil surface.

A tillage device can include a soil disruptor that is configured to couple to an agricultural implement. The soil disruptor can be sized and shaped so that when the soil disruptor is moved by an agricultural implement through a target soil profile beneath a soil surface, the soil disruptor creates a soil disruption in the target soil profile without tilling the soil surface above the soil disruption.

In some examples, the tillage device can include soil disruptor portions that are sized and shaped to create a subterranean soil disruption pattern that, in cross-section, has soil disruption features extending in two dimensions. For example, the soil disruptor portions could create a transverse soil disruption and another soil disruption that is oblique or perpendicular to the transverse soil disruption. The transverse soil disruption can, for example, be horizontal, parallel to the soil surface, or angled with respect to the soil surface.

An example tillage device can include a soil disruptor that includes a first transverse blade, a first fracture blade extending from a first side of the first transverse blade, and a second fracture blade extending from a second side of the first transverse blade. The first transverse blade, the first fracture blade, and the second fracture blade can be sized and shaped to create a soil disruption in a target soil profile without disrupting a soil surface above the target soil profile, except for a narrow band around a shank that moves the soil disruptor. In some examples, the first fracture blade and the second fracture blade can extend downward from the first transverse blade. In some examples, when the tillage device is moved through a soil profile, the first transverse blade creates a first disruption in the soil profile beneath the soil surface in a transverse direction, the first fracture blade creates a second disruption in the soil profile below the first transverse blade, and the second fracture blade creates a third disruption in the soil profile below the first transverse blade. In some examples, the first fracture blade and second fracture blade can reduce compaction or provide soil fracture. Subterranean soil fracture by the blade can, for example, promote root production, nutrient uptake, or water flow. Some fracture blade configurations can create a trench, for example.

In some examples, the first transverse blade has a top surface and a bottom surface, and the first fracture blade and the second fracture blade extend downward from the bottom surface of the first transverse blade. The tillage device can optionally further include a third fracture blade extending upward from the top surface of the first transverse blade, and a fourth fracture blade extending upward from the top surface of the first transverse blade. When such an example tillage device is moved through a soil profile, the tillage device can create a soil disruption both above and below the first transverse blade.

In some examples, the first fracture blade is aligned with the third fracture blade, and the second fracture blade is aligned with the fourth fracture blade. In some examples, when the tillage device is moved through a soil profile, the tillage device creates an I-shaped soil disruption. In other examples, the first fracture blade is offset from the third fracture blade, and the second fracture blade is offset from the fourth fracture blade. For example, the fracture blades can be offset to approximately match an expected root growth pattern (e.g., expanding with depth, in which case lower fracture blades are farther apart than upper fracture blades, or converging with depth, in which case lower fracture blades are closer together than upper fracture blades).

In some examples, the first transverse blade can be coupled to a shank. The tillage device can further include a second transverse blade coupled to the shank below the first transverse blade, a first lower fracture blade extending from the second transverse blade, and a second lower fracture blade extending from the second transverse blade. The second transverse blade can have a top surface and a bottom surface. The first lower fracture blade and second lower fracture blade can, for example (or alternatively) extend downward from the bottom surface of the second transverse blade. In some examples, a third lower fracture blade extends upward from the top surface of the second transverse blade, and a fourth lower fracture blade extends upward from the top surface of the second transverse blade. When the tillage device is moved through a soil profile, the tillage device can create a soil disruption above and below the second transverse blade. In some examples, the first transverse blade and second transverse blade can extend horizontally, and the fracture blades can extend horizontally away from the first transverse blade or second transverse blade.

In some examples, the tillage device can be configured to receive a fertilizer container. The tillage device can include a fertilizer disperser proximate the first transverse blade. The fertilizer disperser can be sized and shaped to disperse fertilizer to a first portion of the soil disruption created by the first fracture blade and a second portion of soil disruption created by the second fracture blade. In an example, the fertilizer dispenser can include a ridge that diverts fertilizer toward a soil fracture region. In some examples, fertilizer disperser can be sized and shaped to deliver fertilizer proximate a tail end of the first fracture blade and a tail end of the second fracture blade.

Another example tillage device can include a first transverse blade configured to be coupled to a shank. The first transverse blade can be sized and shaped to create a soil disruption in a soil profile below a soil surface without disrupting the soil surface. The tillage device can further include a first fracture blade extending downward from the first transverse blade, and a second fracture blade extending downward from the first transverse blade. The first fracture blade and second fracture blade can be sized and shaped to fracture soil below the first transverse blade.

The tillage device can optionally include a third fracture blade extending upward from the first side of the first transverse blade, and a fourth fracture blade extending upward from the second side of the first transverse blade. When the tillage device is moved through the soil profile, the tillage device can create a first soil disruption that extends below and above the first transverse blade. The first transverse blade, the first fracture blade, the second fracture blade, the third fracture blade, and the fourth fracture blade can be sized and shaped so that when the tillage device is moved through a soil profile beneath a soil surface, the tillage device creates a soil disruption below the soil surface without tilling the soil surface. The fracture blades extending above the transverse blades can be sized and shaped to avoid disrupting the soil surface, for example by sizing the fracture blades to be a specified amount shorter than a depth at which the transverse blade is designed to run below the soil surface, so the fracture blades do not excessively disrupt the soil surface.

In some examples, the third fracture blade can be aligned with the first fracture blade, and the fourth fracture blade can be aligned with the second fracture blade. When the tillage device is moved through the soil profile, the tillage device can create an I-shaped soil disruption that is sized and shaped to create a tilled rooting zone beneath the soil surface to support root development.

In some examples, the tillage device can include a second transverse blade having a first side and a second side, the second transverse blade coupled to the shank at a location between the first side and the second side of the second transverse blade. The tillage device can also include a first lower fracture blade extending upward from the second transverse blade, and a second lower fracture blade extending upward from the second transverse blade. When the tillage device is moved through a soil profile, the second transverse blade, the first lower fracture blade, and the second lower fracture blade can create a second soil disruption beneath the first soil disruption.

In another example, a tillage device for disrupting a soil profile beneath a soil surface without tilling the soil surface can include a first tillage means for creating a first soil disruption below the soil surface without tilling the soil surface, a second tillage means for creating a second soil disruption below the soil surface and above the first tillage means without tilling the soil surface, the second tillage means being coupled to the first tillage means. The first soil disruption and second soil disruption can create a tilled rooting zone beneath the soil surface to support root development. In an example, the first tillage means can include a means for creating a transverse soil disruption, and the second tillage means can be sized and shaped to create a plurality of soil disruptions extending above the transverse soil disruption. In an example, the first tillage means can include a first transverse blade and the second tillage means can include a plurality of fracture blades extending upward from the first transverse blade. The tillage device can optionally include a third tillage means for creating a third soil disruption below the first soil disruption and the second soil disruption. The tillage device can also optionally include a means for distributing a crop-enhancing product beneath the soil surface and a means for dispersing the crop-enhancing product into the tilled rooting zone.

In some examples, the tillage device can include a shank, and the first tillage means can include a first transverse blade coupled to the shank. The second tillage means can include a second transverse blade coupled to the shank below the first transverse blade. The first transverse blade and second transverse blade can be sized and shaped so that when the tillage device is moved through a soil profile beneath a soil surface, the tillage device fractures soil in the soil profile without disrupting the soil surface. In some examples, the first tillage means can further include a first fracture blade extending downward from the first transverse blade. The second tillage means can optionally further include a second fracture blade extending downward from the second transverse blade.

An example method for tilling a soil profile can include moving a soil disruptor into a target soil profile beneath a soil surface, and disrupting a first lateral region of the target soil profile and a second lateral region of the soil profile without tilling the soil surface above the first lateral region of the target soil profile and without tilling the soil surface above the second lateral region of the target soil profile. In an example, disrupting the target soil profile includes moving a soil disruptor through the soil profile. In an example, the method can further include disrupting a second soil profile beneath the target soil profile.

NUMBERED EXAMPLES

Example 1 includes a tillage device including a soil disruptor configured to couple to an agricultural implement, the soil disruptor sized and shaped to create a soil disruption in a target soil profile beneath a soil surface without tilling the soil surface above the soil disruption when the soil disruptor is moved through the target soil profile by the agricultural implement.

In Example 2, the subject matter of Example 1 optionally includes, wherein the tillage device includes soil disruptor portions that are sized and shaped to create a subterranean soil disruption pattern that, in cross-section, has soil disruption features extending in two dimensions.

In Example 3, the subject matter of Examples 1 or 2 optionally includes a soil disruptor that includes a first transverse blade, a first fracture blade extending from a first side of the first transverse blade, and a second fracture blade extending from a second side of the first transverse blade. The first transverse blade, the first fracture blade, and the second fracture blade are sized and shaped to create the soil disruption in the target soil profile.

In Example 4, the subject matter of any one or any combination of Examples 1-3 optionally includes the first fracture blade and the second fracture blade extending downward from the first transverse blade.

In Example 5, the subject matter of any one or any combination of Examples 1-4 optionally includes, wherein when the tillage device is moved through a soil profile, the first transverse blade creates a first disruption in the soil profile beneath the soil surface in a transverse direction, the first fracture blade creates a second disruption in the soil profile below the first transverse blade, and the second fracture blade creates a third disruption in the soil profile below the first transverse blade.

In Example 6, the subject matter of any one or any combination of Examples 1-5 optionally includes the first transverse blade having a top surface and a bottom surface, the first fracture blade and the second fracture blade extending downward from the bottom surface of the first transverse blade, the tillage device further including a third fracture blade extending upward from the top surface of the first transverse blade and a fourth fracture blade extending upward from the top surface of the first transverse blade, wherein when the tillage device is moved through a soil profile, the tillage device creates a soil disruption above and below the first transverse blade.

In Example 7, the subject matter of any one or any combination of Examples 1-6 optionally includes wherein the first fracture blade is aligned with the third fracture blade, and the second fracture blade is aligned with the fourth fracture blade, wherein when the tillage device is moved through a soil profile, the tillage device creates an I-shaped soil disruption.

In Example 8, the subject matter of any one or any combination of Examples 1-7 optionally includes wherein the first transverse blade is coupled to a shank, the tillage device further including a second transverse blade coupled to the shank below the first transverse blade, a first lower fracture blade extending from the second transverse blade and a second lower fracture blade extending from the second transverse blade.

In Example 9, the subject matter of any one or any combination of Examples 1-8 optionally includes, wherein the second transverse blade has a top surface and a bottom surface, the first lower fracture blade and second lower fracture blade extending downward from the bottom surface of the second transverse blade.

In Example 10, the subject matter of any one or any combination of Examples 1-9 optionally includes the tillage device further including a third lower fracture blade extending upward from the top surface of the second transverse blade, and a fourth lower fracture blade extending upward from the top surface of the second transverse blade, wherein when the tillage device is moved through a soil profile, the tillage device creates a soil disruption above and below the second transverse blade.

In Example 11, the subject matter of any one or any combination of Examples 1-10 optionally includes wherein the tillage device is configured to receive a fertilizer container, the tillage device further comprising a fertilizer disperser proximate the first transverse blade, the fertilizer disperser sized and shaped to disperse fertilizer to a first portion of the soil disruption created by the first fracture blade and a second portion of soil disruption created by the second fracture blade.

In Example 12, the subject matter of any one or any combination of Examples 1-11 optionally includes wherein the fertilizer disperser is sized and shaped to deliver fertilizer proximate a tail end of the first fracture blade and a tail end of the second fracture blade.

Example 13 includes a tillage device including a first transverse blade configured to be coupled to a shank, the first transverse blade being sized and shaped to create a soil disruption in a soil profile below a soil surface without disrupting the soil surface, a first fracture blade extending downward from the first transverse blade and a second fracture blade extending downward from the first transverse blade, the first fracture blade and second fracture blade being sized and shaped to fracture soil below the first transverse blade.

In Example 14 the subject matter of Examples 13 optionally includes a third fracture blade extending upward from the first side of the first transverse blade, and a fourth fracture blade extending upward from the second side of the first transverse blade, wherein when the tillage device is moved through the soil profile, the tillage device creates a first soil disruption that extends below and above the first transverse blade; and wherein the first transverse blade, the first fracture blade, the second fracture blade, the third fracture blade, and the fourth fracture blade are sized and shaped so that when the tillage device is moved through a soil profile beneath a soil surface, the tillage device creates a soil disruption below the soil surface without tilling the soil surface.

In Example 15, the subject matter of Examples 13 or 14 optionally includes the third fracture blade being aligned with the first fracture blade, and the fourth fracture blade being aligned with the second fracture blade, wherein when the tillage device is moved through the soil profile, the tillage device creates an I-shaped soil disruption that is sized and shaped to create a tilled rooting zone beneath the soil surface to support root development.

In Example 16, the subject matter of any one or any combination of Examples 1-15 optionally includes a second transverse blade having a first side and a second side, the second transverse blade coupled to the shank at a location between the first side and the second side of the second transverse blade; a first lower fracture blade extending upward from the second transverse blade; and a second lower fracture blade extending upward from the second transverse blade, wherein when the tillage device is moved through a soil profile, the second transverse blade, the first lower fracture blade, and the second lower fracture blade create a second soil disruption beneath the first soil disruption.

Example 17 includes a tillage device for disrupting a soil profile beneath a soil surface without tilling the soil surface. The tillage device includes a first tillage means for creating a first soil disruption below the soil surface without tilling the soil surface, a second tillage means for creating a second soil disruption below the soil surface and above the first tillage means without tilling the soil surface, the second tillage means being coupled to the first tillage means. The first soil disruption and second soil disruption create a tilled rooting zone beneath the soil surface to support root development.

In Example 18, the subject matter of Example 17 optionally includes wherein the first tillage means includes a means for creating a transverse soil disruption, and the second tillage means is sized and shaped to create a plurality of soil disruptions extending above the transverse soil disruption.

In Example 19, the subject matter of Examples 17 or 18 optionally includes wherein the first tillage means includes a first transverse blade and the second tillage means includes a plurality of fracture blades extending upward from the first transverse blade.

In Example 20, the subject matter of any one or any combination of Examples 17-19 optionally includes a third tillage means for creating a third soil disruption below the first soil disruption and the second soil disruption.

In Example 21, the subject matter of any one or any combination of Examples 17-20 optionally includes a means for distributing a crop-enhancing product beneath the soil surface and a means for dispersing the crop-enhancing product into the tilled rooting zone.

In Example 22, the subject matter of any one or any combination of Examples 17-21 optionally includes wherein the tillage device further includes a shank, the first tillage means includes a first transverse blade coupled to the shank, and the second tillage means includes a second transverse blade coupled to the shank below the first transverse blade, the first transverse blade and second transverse blade being sized and shaped so that when the tillage device is moved through a soil profile beneath a soil surface, the tillage device fractures soil in the soil profile without disrupting the soil surface.

In Example 23, the subject matter of any one or any combination of Examples 17-22 optionally includes wherein the first tillage means further includes a first fracture blade extending downward from the first transverse blade, and the second tillage means further includes a second fracture blade extending downward from the second transverse blade.

Example 24 is a method for tilling a soil profile that includes moving a soil disruptor into a target soil profile beneath a soil surface, and disrupting a first lateral region of the target soil profile and a second lateral region of the soil profile without tilling the soil surface above the first lateral region of the target soil profile and without tilling the soil surface above the second lateral region of the target soil profile.

In Example 25, the subject matter of Example 24 optionally includes disrupting the target soil profile by moving a soil disruptor through the soil profile. In Example 26, the subject matter of Examples 24 or 25 optionally includes disrupting a second soil profile beneath the target soil profile.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1A is a perspective view of an example strip tillage device.

FIG. 1B is a cross-sectional view of the strip tillage device shown in FIG. 1A.

DETAILED DESCRIPTION

Figure 2:
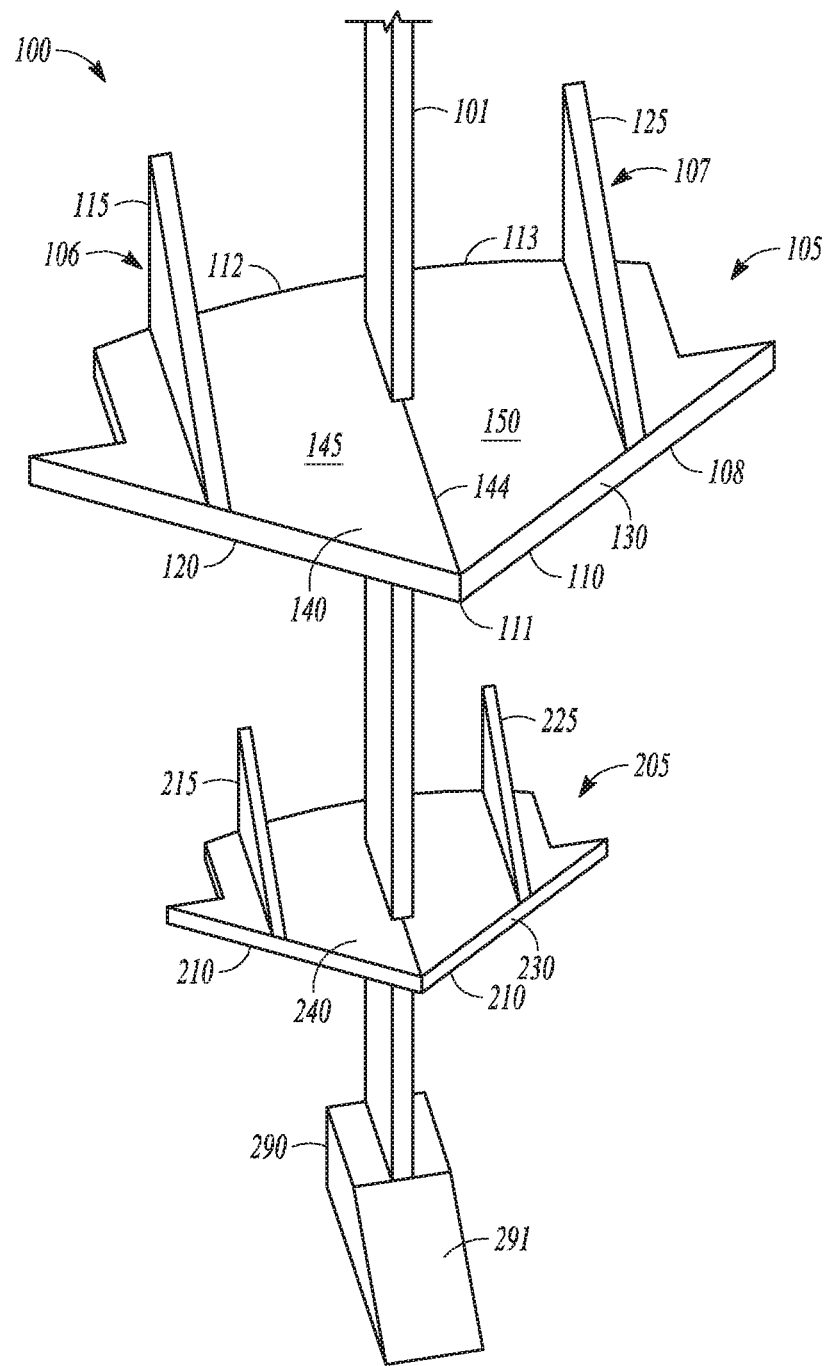
FIG. 2 is a front perspective view of an example tillage device having an upper soil disruptor and a lower soil disruptor.

A tillage device can be sized and shaped to create a soil disruption in a target soil profile that is beneath a soil surface when the tillage device is pulled through a field by an agricultural implement, while avoiding tilling the soil surface above the soil profile. For example, a tillage device may be configured to create a root zone soil disruption, which can promote healthy root development for a seed that is planted in the soil. In some examples, a tillage device can be configured to create one or more sub-surface tillage features, such as a trough extending below a transverse tilled zone, which can avoid compaction effects or further promote root development, nutrient uptake, or water flow. The device may also be configured to avoid significant disruption of the soil surface above the tillage device to avoid erosion, nutrient loss, release of moisture, or carbon dioxide loss, one or more of which can occur when the soil surface is tilled.

A tillage device can be sized and shaped so that the soil surface above the target soil profile may be undisrupted or minimally disrupted by the tillage device. The tillage device may be configured to operate below the soil surface, which can limit soil surface disruption to minor surface variations such as cracking or lifting created by the sub-surface activity, and a narrow path by a shank that connects the tillage device to the agricultural instrument. In an example where a transverse blade is coupled to a shank, the shank can leave a narrow path of disruption (about the width of the shank) behind the shank as the device is pulled through the soil, and the soil surface on each side of the shank path can be undisrupted or minimally disrupted (e.g., cracked or lifted) even though the transverse blade has tilled a soil profile below the surface.

By creating a sub-surface soil disruption in a root zone, while avoiding significant disruption of the soil surface, desirable growth patterns can be achieved, due to the combination of desirable soil conditions created by the sub-surface tillage and avoidance of moisture, nutrient, carbon dioxide, and residue/soil loss that can occur when the soil surface is significantly disrupted.

In some examples, a strip tillage device can also be configured to distribute crop-enhancing products such as anhydrous fertilizer, solid fertilizer, liquid fertilizer, or biologicals, and disperse such crop-enhancing products to the tilled rooting zone to further promote plant and root development.

In some examples, a sub-surface tillage device can be configured to create a soil disruption that has components in two dimensions (e.g., transverse and upward or downward, or horizontal and vertical). For example, a strip tillage device can be configured with structures that disrupt both a lateral aspect of a soil profile and one or more planes that are oblique to the lateral profile. In some examples, a transverse blade can create a transverse component of a soil disruption, and a second blade extending downward (not necessarily vertical) from the transverse blade can create a soil disruption component, such as a trough, below the transverse component. Such a trough can promote root growth, nutrient uptake, and water flow. In some examples, considering the soil profile in cross-section, transverse to the direction that the agricultural implement typically travels, the tillage device can create a desired two-dimensional soil disruption profile shape, such as an "I", for example. In other examples, the tillage device can be sized and shaped to create other two-dimensional soil disruption profiles shapes, such as an X, a plus (+), a V, or curved, inverted, or rotated variations thereof.

Figure 3:
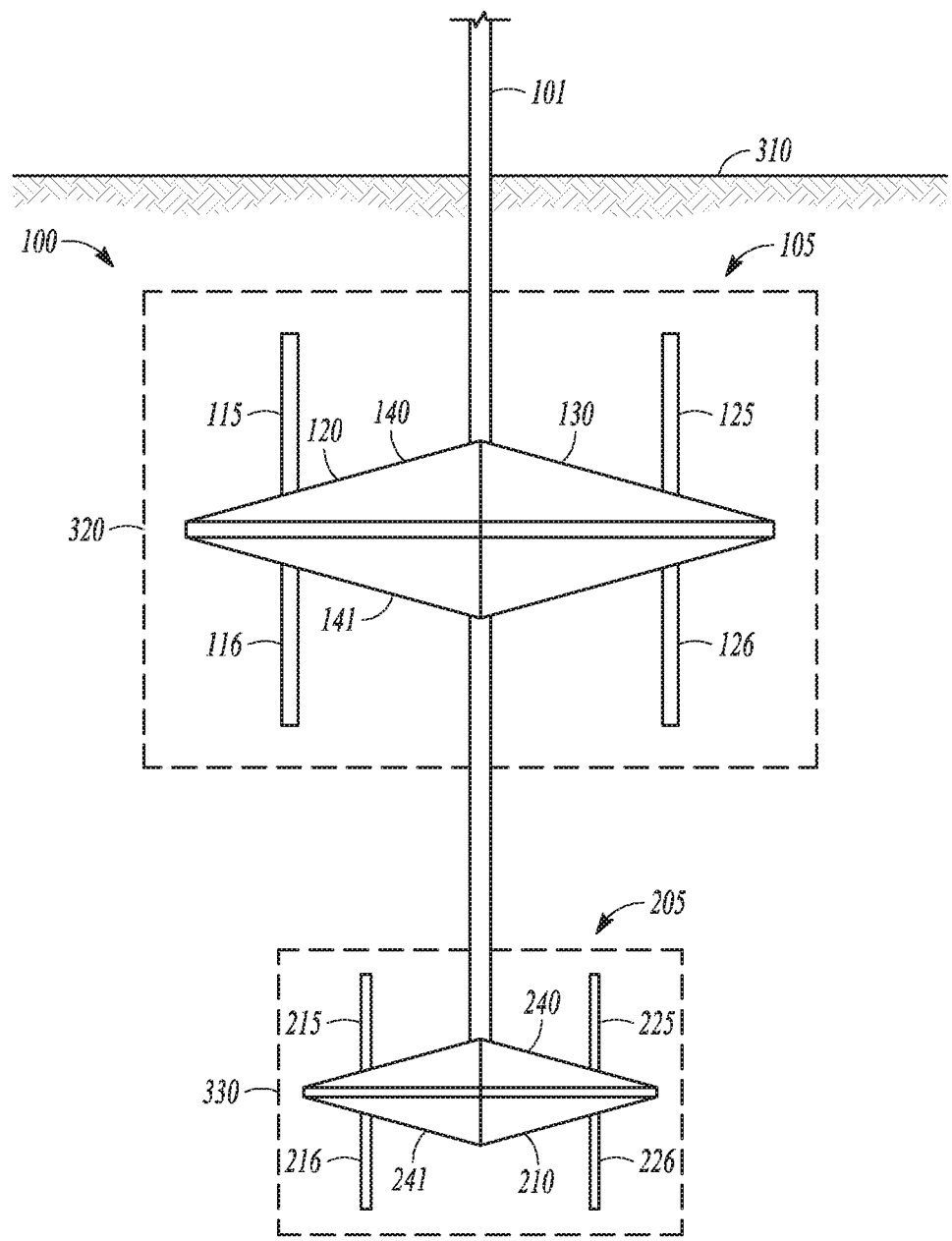
FIG. 3 is a front schematic view of an example tillage device under a soil surface.
Figure 6:
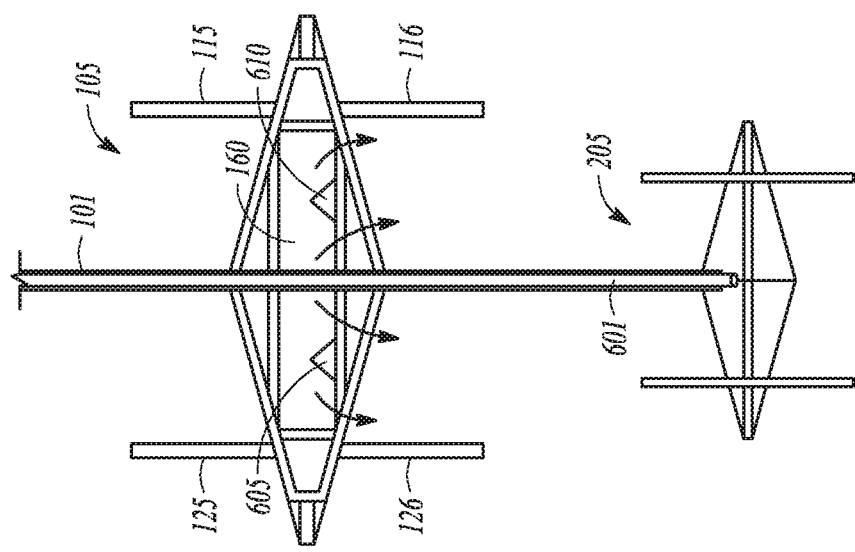
FIG. 6 is a rear view of the tillage device of FIG. 2.
Figure 4:
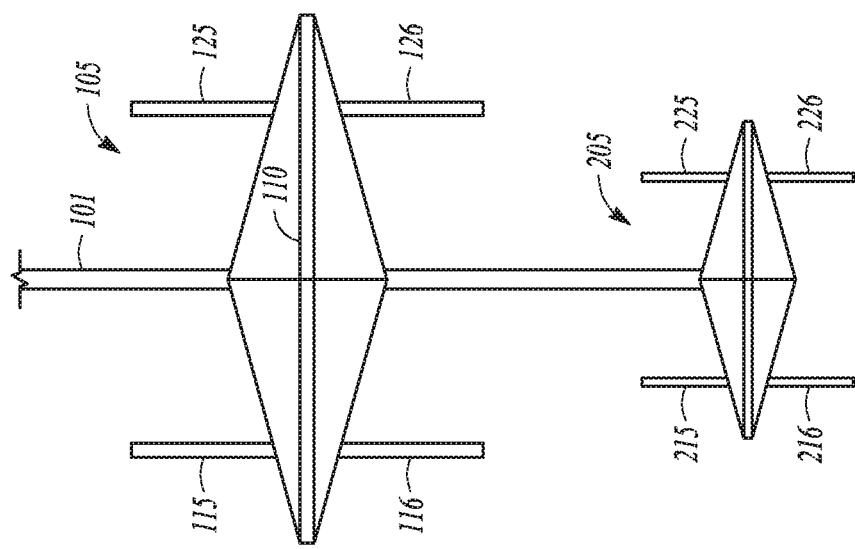
FIG. 4 is a front view of the tillage device of FIG. 2.
Figure 5:
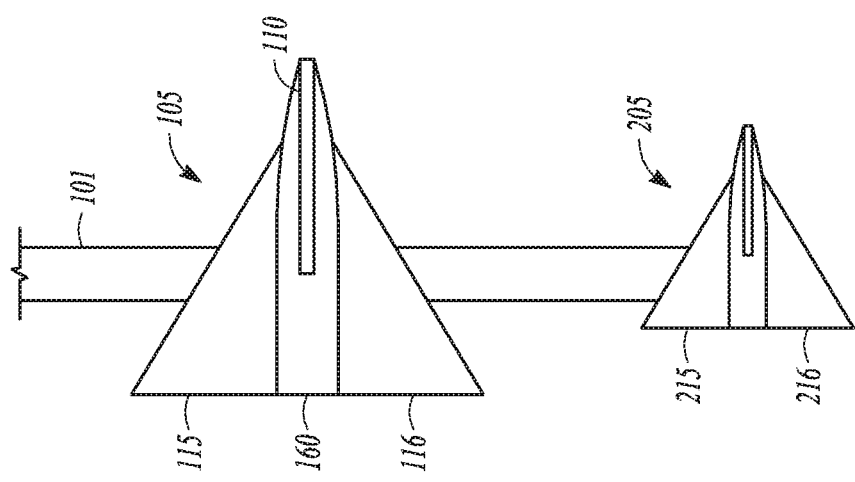
FIG. 5 is a side view of the tillage device of FIG. 2.

An example tillage device 100 including a soil disruptor 105 is shown in FIG. 1A and FIG. 1B. FIG. 2 shows the example tillage device 100 of FIG. 1 and a second soil disruptor 205 situated below soil disruptor 105. FIG. 3 shows the example soil disruptors 105, 205 and target soil profiles 320, 330 beneath a soil surface 310. FIG. 4 is a front view of the tillage device of FIG. 2. FIG. 5 is a side view of the tillage device of FIG. 2. FIG. 6 is a rear view of the tillage device of FIG. 2.

Referring now to FIG. 1, an example tillage device 100 may include a soil disruptor 105 that is configured to create a soil disruption in a target soil profile beneath a soil surface without significant disruption of the soil surface when the soil disruptor is moved through the target soil profile by the agricultural implement. The soil disruptor 105 may be sized and shaped to create a tilled rooting zone beneath the soil surface to support root development. In some examples, the soil disruptor 105 may include one or more soil disruptor portions 106, 107, 108 that are sized and shaped to create a soil disruption pattern that has soil disruption features in two dimensions. For example, a soil disruptor 105 may create a one or more horizontal soil disruptions and one or more vertical soil disruptions. The soil disruptor portions 106, 107, 108 may each have one or more flat or curved faces that are angled with respect to the direction of movement through the soil to displace soil when the tillage device 100 is moved through the soil.

In some examples, the soil disruptor portion 108 may be or include a first transverse blade 110 and soil disruptor portion 106 may be or include a first fracture blade 115 extending from the transverse blade 110. In some examples, the soil disruptor 105 may include a plurality of fracture blades that extend from a top portion 140 of the transverse blade 110, from a bottom portion 142 of the transverse blade (as shown in FIG. 1B), or from both the top portion 140 and the bottom portion 142.

Various blade configurations are possible. In an example, the soil disruptor 105 may include a first fracture blade 115 extending from a first lateral side 120 of the transverse blade 110, and a second fracture blade 125 extending from a second lateral side 130 of the transverse blade 110. The transverse blade 110 may be sized and shaped to create a lateral soil disruption in a target soil profile when the soil disruptor 105 is pulled through soil. The first fracture blade 115 and second fracture blade 125 can be sized and shaped to fracture soil to promote root-growth characteristics in the soil and avoid or reduce soil compaction. While the fracture blades 115, 125 are shown as relatively thin fin-like structures, it is understood that various blade shapes and configurations are possible. The first fracture blade 115 may be sized and shaped to create a second disruption region in the target soil profile in a region that is oblique or perpendicular to the lateral soil disruption. The second fracture blade 125 may be sized and shaped to create a third disruption in the target soil profile in a third disruption region, which may be oblique to the lateral soil disruption. In some examples, the first fracture blade 115 and second fracture blade 125 may extend upward from the transverse blade 110, as illustrated in FIG. 1A. In some examples, a third fracture blade 116 and fourth fracture blade 126 (shown in FIG. 3) extend downward from a bottom portion 142 (FIG. 1B) of the blade 110. In various examples, some or all of the fracture blades 115, 116, 125, 126 can fracture soil to avoid or reduce compaction and provide space for root growth, nutrient availability, or water movement. For example, fracture blades 116, 126 may be configured to create a trough or other soil disruption feature below a transverse soil disruption created by the transverse blade 110, which can result in a soil disruption profile that has soil disruption features that extend in two dimensions (e.g., transverse and upward/downward, lateral and oblique or perpendicular, or horizontal and vertical).

In some examples, the transverse blade 110 may create a lateral disruption, which may be horizontal, or angled from horizontal, and the first fracture blade 115 and second fracture blade 125 may create vertical soil disruptions. In other examples, the first fracture blade 115 and second fracture blade 125 may be angled away from vertical, e.g., the first fracture blade 115 may extend upward from the transverse blade 110 at a first angle and the second fracture blade 125 may extend upward from the transverse blade 110 at a second angle, which may be, but is not necessarily, the same as or a reflection of the first angle. In an example, the first fracture blade 115 and second fracture blade 125 extend upward and away from each other at about 15 degrees off vertical, i.e., at 75 degrees and 105 degrees from horizontal. In another example, the first fracture blade 115 and second fracture blade 125 extend upward and toward each other at about 30 to 45 degrees from vertical.

The transverse blade 110 may be coupled to a shank 101 that may be coupled to an agricultural implement. In an example, the shank 101 may be coupled to a center portion 111 of the transverse blade 110. A first side portion 112 of the transverse blade 110 may extend laterally away from the center portion 111 in a first direction, and a second side portion 113 of the transverse blade 110 may extend laterally away from the center portion 111 of the transverse blade in a second direction.

In some examples, the transverse blade 110 may include a leading edge 130 and a top portion 140 that rises up from the leading edges 130, 135 to lift soil as the transverse blade 110 is moved through soil. The transverse blade 110 may also include a bottom portion 142 (shown in FIG. 1B) that is tapered down away from the leading edge 130 to press soil downward to create an additional soil disruption below the transverse blade 110. In some examples, first and second faces 145, 150 on the top portion 140 of the transverse blade 110 can be angled outward away from the center portion 111 of the transverse blade 110 and downward toward the leading edge 130 to displace soil outward and upward from the blade 110 when the blade 110 is pulled through a soil profile. In some examples, the faces 145, 150 can be planar. In an example, the faces 145, 150 may meet at a peak 141 (shown in FIG. 1B) that may be centrally located on the transverse blade 110. In other examples, the faces 145, 150 can be curved. In some examples, the faces 145, 150 are parabolic or hyperbolic. In some examples, the faces 145 are convex or concave. The faces 145, 150 may be symmetric to provide balanced forces acting on the shank 101 when the tillage device 100 is moved through soil.

FIG. 1B shows a cross-section of the example tillage device 100 of FIG. 1A. In some examples, a chamber 155 is created between an angle top portion 140 and bottom portion 142. In some examples, the peak 141 on the top portion 140 and a peak 143 on the bottom portion 142 create an angle of 10 to 35 degrees. In an example, the angle is about 15 degrees.

In some examples, the tillage device 100 may include a receptacle 160 for crop-enhancing product such as fertilizer.

The receptacle 160 may be positioned in the chamber 155, or it may be defined by the walls of the chamber 155.

FIG. 2 is a front perspective view of an example tillage device 100 that includes the soil disruptor 105 shown in FIG. 1 and a lower soil disruptor 205. The lower soil disruptor 205 may include a second lower transverse blade 210. The soil disruptor 205 may also include a first lower fracture blade 215 extending upward from a first lateral side 220 of the second lower transverse blade 210, and a second lower fracture blade 225 extending upward from a second lateral side 230 of the blade 210. The lower soil disruptor 205 may also include a third lower fracture blade 216 and fourth lower fracture blade 226 (shown in FIG. 3) extending downward from a bottom portion 241 (shown in FIG. 3) of the lower soil disruptor 205. The tillage device 100 may also optionally include a submersion element 290 having an angled face 291 that is sized and shaped to introduce the tillage device 100 to the soil and pull the tillage device 100 down into the soil as due to downward forces created on the sharply angled face 291. In some examples, the various portions of the tillage device 100 may be sized and shaped to balance upward and downward forces once the tillage device 100 is submerged to maintain the tillage device 100 at a consistent depth beneath the soil surface. The tillage device 100 may also be locked at a depth using aboveground structures that are coupled to the agricultural implement.

FIG. 3 is a front schematic view of the example tillage device 100 situated under a soil surface 310. The soil disruptor 105 may be sized and shaped to create a soil disruption in a target soil profile 320. The lower soil disruptor 205 may be sized and shaped to create a soil disruption in lower target soil profile 330. The tillage device 100 may be sized and shaped so that it creates disruptions in the target soil profile 320 with minimal disruption of the soil surface 310, e.g., without tilling the soil surface 310. In contrast, prior art strip tillage devices create a berm as they till a strip of soil in a field.

In some examples, there may be a gap between target soil profile 320 and lower target soil profile 330. In other examples, the soil disruptors 105, 205 are configured so that target soil profile 320 and lower target soil profile 330 meet or intersect to provide a continuous volume of tilled soil in the rooting zone beneath the soil surface 310. One or both of the soil disruptors 105, 205 can be configured to establish soil disruption in a target soil disruption zone that overlaps or coincides with a rooting zone. For example, when a seed is planted, a developing root can grow and extend downward through the target soil profile 320 and eventually into the lower target soil profile 330. By contrast, some prior art tillage devices tend to create compaction layers below a tillage zone, which can limit root development. In some examples, the soil disruptors 105, 205 can be configured to distribute crop-enhancing products such as anhydrous fertilizer, solid fertilizer, liquid fertilizer, or biologicals, and disperse such crop-enhancing products to the target soil profiles 320, 330 to provide a tilled and fertilized rooting zone to further promote plant and root development.

FIGS. 4, 5, and 6 are respective front, side, and back views of the example soil disruptor. The example shown does not include the submersion element 290 shown in FIG. 2.

In the rear view of the tillage device 100 shown in FIG. 6, a receptacle 160 is shown. The receptacle 160 can house crop-enhancing products such as a solid fertilizer. In an example, fertilizer can be placed in the fertilizer receptacle, e.g., the receptacle 160, either directly or by placement of a fertilizer container in the receptacle 160. Fertilizer can be delivered from the receptacle 160 out the back of the soil disruptor 105. Fertilizer can also be pumped to the soil disruptor 105 from an agricultural implement.

Figure 7:
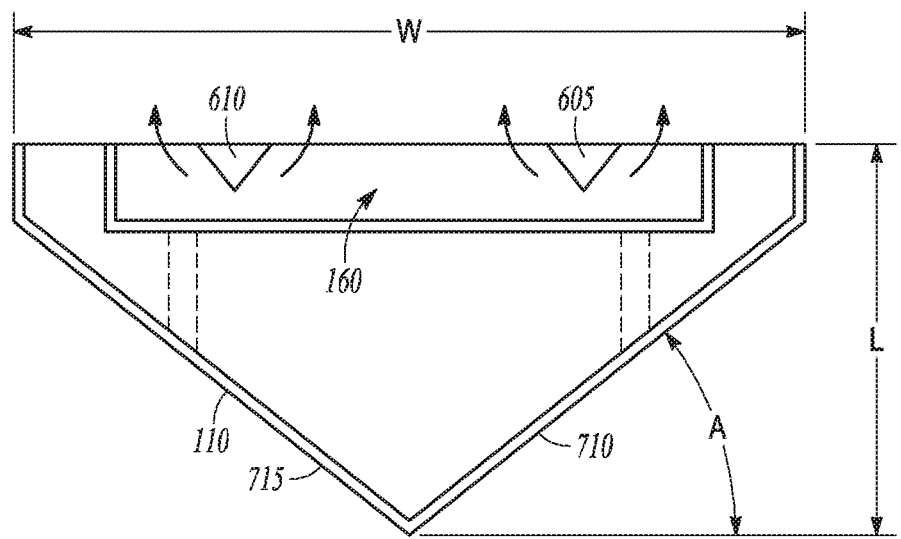
FIG. 7 is a top cross-sectional view of an example tillage device.

In some examples, a fertilizer disperser can be provided to assure delivery of fertilizer to a particular area of the target soil profile 320, such as behind the blade 110 or behind the fracture blades 115, 125, where soil is most likely to be loosened from the disruption by the tilling device 100. FIG. 6 and FIG. 7 show fertilizer dispersers 605, 610. The fertilizer dispersers 605, 610 can be in or near the receptacle 160. The receptacle 160 and fertilizer dispersers 605, 610 can be sized and shaped so that fertilizer flows, as indicated by arrows in FIG. 6 and FIG. 7, from the receptacle 160 around the fertilizer dispersers 605, 610 and into disrupted soil regions behind the blade 110 or one or more of the fracture blades 115, 116, 125, 126.

In some examples, liquid fertilizer can be delivered near the soil disruptor 105, lower soil disruptor 205, or both. In FIG. 6, a hose 601 extends down the shank 101 and terminates near lower soil disruptor 205, at which point the liquid fertilizer (pumped from an agricultural implement) can be delivered into a target soil profile 320 where the soil has been disrupted by the lower soil disruptor 205.

FIG. 7 is a top cross-sectional view of the soil disruptor 105 at its widest (middle) section. The length (l) and width (w) of the device are labeled. In some examples, the soil disruptor 105 can be approximately 6 to 12 cm long and 20-30 cm wide. In some examples, the fracture blades in various examples shown and described herein may be 5-8 cm (2-3 inches) tall. Larger and smaller widths, lengths, and heights are possible. In an example, the size of the soil disruptor 105 can be selected based on soil conditions, seed type/crop, or both. In some examples, the blade 110 can include edges 710, 715 that are symmetrically swept back at an angle (A) of about 5 to 20 degrees. In an example, the angle A can be about 7.5 degrees.

Figure 8:
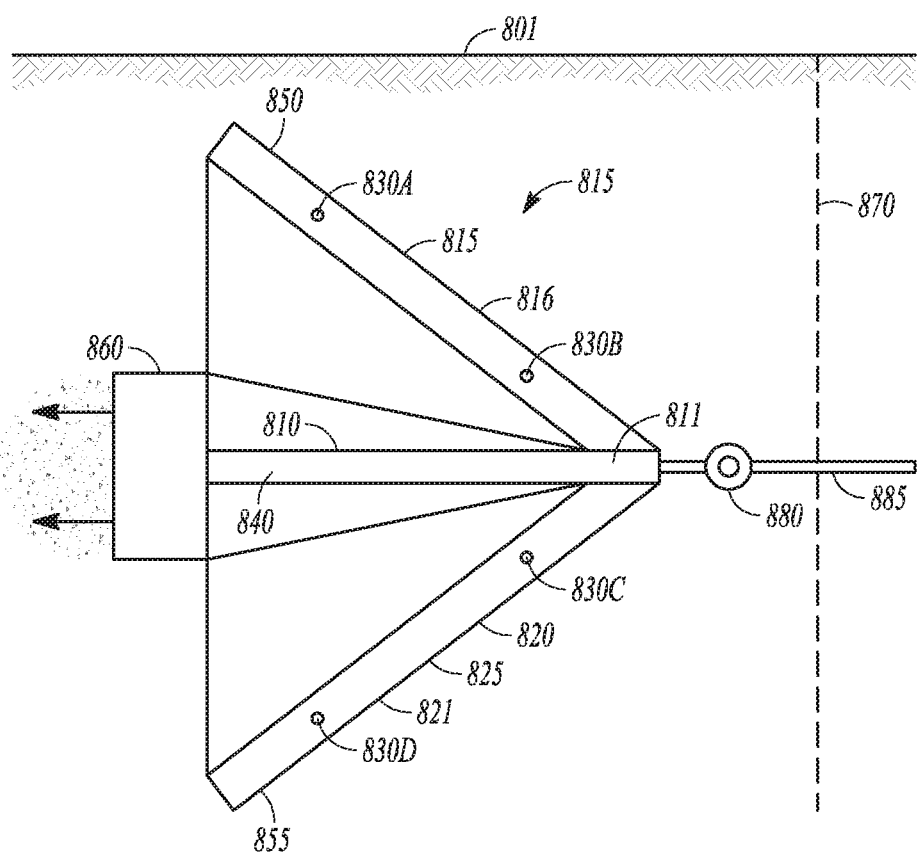
FIG. 8 is a side view of an example tillage device having replaceable wear strips.

FIG. 8 is a side view of an example tillage device having replaceable wear strips. In some examples, the soil disruptor 805 can be configured with replaceable wear strips 810, 815, 820 along front-facing edges 811, 816, 821. In an example, the wear strips 810, 815, 820 can be made of a durable polymer such as high density polyethylene (HDPE) or metal based materials. In some examples, the wear strips 810, 815, 820 can be made of a metal such as steel. The wear strips 810, 815, 820 can be coupled to the fracture transverse blade 840 or fracture blades 850, 855 using connectors 830a, 830b, 830c, 830d, which can be bolts, for example.

In FIG. 8, a receptacle 860 is shown behind the blade 840 and fracture blades 850, 855 as opposed to in the blade 840. In some examples, the receptacle 860 can be connected to or integrally formed with the soil disruptor 805. In some examples, the receptacle 860 can be removable, for example using bolt connections.

As shown in the other illustrated examples, the soil disruptor 805 can be coupled to a shank that may be coupled to an agricultural implement that may pull the soil disruptor 805 through the soil profile 870. Any of the soil disruptor examples described herein may also be moved through a target soil profile using other techniques. For example, the soil disruptor 805 includes a connection point 880 that may include an eye bolt, for example, and a pulling element 885 such as a cable or chain may be attached to the connection point 880 and used to pull the soil disruptor 805 through the soil profile 870 below the soil surface 801.

An example method for tilling a soil profile can include moving a soil disruptor into a target soil profile beneath a soil surface, and disrupting a first lateral region of the target soil profile and a second lateral region of the soil profile without tilling the soil surface above the first lateral region of the target soil profile and without tilling the soil surface above the second lateral region of the target soil profile. The method can be performed, for example, using any of the tillage devices and soil disruptors described in the detailed description and shown in the figures. For example, disrupting the target soil profile can include moving a soil disruptor through the soil profile. The method can further include disrupting a second soil profile beneath the target soil profile, for example using a tillage device with upper and lower soil disruptors as shown in FIG. 2.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the inventive subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the inventive subject matter should be determined with reference to the appended claims, along with the full scope of equivalents to which such claims are entitled.

I claim:
1. A tillage device comprising:
a soil disruptor configured to couple to an agricultural implement, the soil disruptor including:
a first transverse blade coupled to a shank;
a first upper fracture blade extending from a first side of the first transverse blade, wherein the first transverse blade extends beyond the first fracture blade;
a second transverse blade coupled to the shank and spaced apart from the first transverse blade;
a first lower fracture blade extending from the second transverse blade, wherein the first lower fracture blade is inset from the first upper fracture blade to locate the first lower fracture blade closer to the shank than the first upper fracture blade; and
wherein the soil disruptor sized and shaped to create a soil disruption in a target soil profile beneath a soil surface without tilling the soil surface above the soil disruption when the soil disruptor is moved through the target soil profile by the agricultural implement.

2. The tillage device of claim 1, wherein the tillage device includes soil disruptor portions that are sized and shaped to create a subterranean soil disruption pattern that, in cross-section, has soil disruption features extending in two dimensions.

3. The tillage device of claim 1, wherein the soil disruptor includes:
a second upper fracture blade extending from a second side the first transverse blade.

4. The tillage device of claim 3, wherein the first upper fracture blade and the second upper fracture blade extend downward from the first transverse blade.

5. The tillage device of claim 4, wherein when the tillage device is moved through a soil profile, the first transverse blade creates a first disruption in the soil profile beneath the soil surface in a transverse direction, the first upper fracture blade creates a second disruption in the target soil profile below the first transverse blade, and the second upper fracture blade creates a third disruption in the target soil profile below the first transverse blade.

6. The tillage device of claim 3, wherein the first transverse blade has a top surface and a bottom surface, the first upper fracture blade and the second upper fracture blade extend downward from the bottom surface of the first transverse blade, the tillage device further comprising:
a third upper fracture blade extending upward from the top surface of the first transverse blade; and
a fourth upper fracture blade extending upward from the top surface of the first transverse blade,
wherein when the tillage device is moved through the target soil pro , the tillage device creates a soil disruption above and below the first transverse blade.

7. The tillage device of claim 6, wherein the first upper fracture blade is aligned with the third upper fracture blade, and the second upper fracture blade is aligned with the fourth upper fracture blade, wherein when the tillage device is moved through the target soil profile, the tillage device creates an I-shaped soil disruption.

8. The tillage device of claim 1, further comprising a second lower fracture blade extending from the second transverse blade.

9. The tillage device of claim 8, wherein the second transverse blade has a top surface and a bottom surface, the first lower fracture blade and the second lower fracture blade extending downward from the bottom surface of the second transverse blade.

10. The tillage device of claim 9, further comprising a third lower fracture blade extending upward from the top surface of the second transverse blade, and a fourth lower fracture blade extending upward from the top surface of the second transverse blade, wherein when the tillage device is moved through the target soil profile, the tillage device creates a soil disruption above and below the second transverse blade.

11. The tillage device of claim 3, wherein the tillage device is configured to receive a fertilizer container, the tillage device further comprising a fertilizer disperser proximate the first transverse blade, the fertilizer disperser sized and shaped to disperse fertilizer to a first portion of the soil disruption created by the first fracture blade and a second portion of soil disruption created by the second fracture blade.

12. The tillage device of claim 11, wherein the fertilizer disperser is sized and shaped to deliver fertilizer proximate a tail end of the first fracture blade and a tail end of the second fracture blade.

13. A tillage device comprising:
a first transverse blade configured to be coupled to a shank, the first transverse blade being sized and shaped to create a soil disruption in a soil profile below a soil surface without disrupting the soil surface;
a first upper fracture blade extending downward from the first transverse blade and a second upper fracture blade extending downward from the first transverse blade, the first upper fracture blade and second upper fracture blade being sized and shaped to fracture soil below the first transverse blade;
a second transverse blade configured to be coupled to the shank and spaced apart from the first transverse blade;
a first lower fracture blade extending from the second transverse blade, wherein the first lower fracture blade is inset from the first upper fracture blade to locate the first lower fracture blade closer to the shank than the first upper fracture blade.

14. The tillage device of claim 13, further comprising:
a third upper fracture blade extending upward from a first side of the first transverse blade; and
a fourth upper fracture blade extending upward from a second side of the first transverse blade, wherein when the tillage device is moved through the soil profile, the tillage device creates a first soil disruption that extends below and above the first transverse blade,
wherein the first transverse blade, the first upper fracture blade, the second upper fracture blade, the third upper fracture blade, and the fourth upper fracture blade are sized and shaped so that when the tillage device is moved through the soil profile beneath the soil surface, the tillage device creates a soil disruption below the soil surface without tilling the soil surface.

15. The tillage device of claim 14, wherein the third upper fracture blade is aligned with the first upper fracture blade, and the fourth upper fracture blade is aligned with the second upper fracture blade, wherein when the tillage device is moved through the soil profile, the tillage device creates an I-shaped soil disruption that is sized and shaped to create a tilled rooting zone beneath the soil surface to support root development.

16. The tillage device of claim 14, wherein the second transverse blade has a first side and a second side, and the second transverse blade is configured to couple to the shank at a location between the first side and the second side of the second transverse blade and the first lower fracture blade extends upward from the second transverse blade, the tollage device further comprising:
a second lower fracture blade extending upward from the second transverse blade,
wherein when the tillage device is moved through the soil profile, the second transverse blade, the first lower fracture blade, and the second lower fracture blade create a second soil disruption beneath the first soil disruption.

17. A tillage device comprising:
a soil disruptor configured to couple to an agricultural implement, the soil disruptor including:
a first transverse blade having a top surface and a bottom surface;
a first upper fracture blade extending downward from the bottom surface of the first transverse blade, wherein the first transverse blade extends beyond the first fracture blade;
a second upper fracture blade extending downward from the bottom surface of the first transverse blade, wherein the first transverse blade extends beyond the second fracture blade;
a third upper fracture blade extending upward from the top surface of the first transverse blade; and
a fourth upper fracture blade extending upward from the top surface of the first transverse blade, and wherein:
the first upper fracture blade is aligned with the third upper fracture blade, and the second upper fracture blade is aligned with the fourth upper fracture blade and when the tillage device is moved through the target soil profile, the tillage device creates an I-shaped soil disruption; and
the soil disruptor is sized and shaped to create a soil disruption in a target soil profile beneath a soil surface without tilling the soil surface above the soil disruption when the soil disruptor is moved through the target soil profile by the agricultural implement, wherein when the tillage device is moved through the target soil profile, the tillage device creates a soil disruption above and below the first transverse blade.

18. A tillage device comprising:
a soil disruptor configured to couple to an agricultural implement, the soil disruptor including:
a first transverse blade, wherein the first transverse blade is coupled to a shank;
a first fracture blade extending from a first side of the first transverse blade, wherein the first transverse blade extends beyond the first fracture blade;
a second transverse blade coupled to the shank below the first transverse blade;
a first lower fracture blade extending from the second transverse blade; and
a second lower fracture blade extending from the second transverse blade;
wherein the second transverse blade has a top surface and a bottom surface, the first lower fracture blade and the second lower fracture blade extending downward from the bottom surface of the second transverse blade; and wherein the soil disruptor is sized and shaped to create a soil disruption in a target soil profile beneath a soil surface without tilling the soil surface above the soil disruption when the soil disruptor is moved through the target soil profile by the agricultural implement.

19. A tillage device comprising:

a first transverse blade configured to be coupled to a shank, the first transverse blade being sized and shaped to create a soil disruption in a soil profile below a soil surface without disrupting the soil surface;

a first upper fracture blade extending downward from the first transverse blade and a second upper fracture blade extending downward from the first transverse blade, the first upper fracture blade and second upper fracture blade being sized and shaped to fracture soil below the first transverse blade;

wherein the first transverse blade, the first upper fracture blade, the second upper fracture blade, the third upper fracture blade, and the fourth upper fracture blade are sized and shaped so that when the tillage device is moved through the soil profile beneath the soil surface, the tillage device creates a soil disruption below the soil surface without tilling the soil surface;

a second transverse blade having a first side and a second side, the second transverse blade coupled to the shank at a location between the first side and the second side of the second transverse blade;

a first lower fracture blade extending upward from the second transverse blade; and a second lower fracture blade extending upward from the second transverse blade, wherein when the tillage device is moved through the soil profile, the second transverse blade, the first lower fracture blade, and the second lower fracture blade create a second soil disruption beneath the first soil disruption.

* * * * *

UNITED STATES PATENT AND TRADEMARK OFFICE
CERTIFICATE OF CORRECTION

PATENT NO. : 10,743,452 B2  
APPLICATION NO. : 15/425188  
DATED : August 18, 2020  
INVENTOR(S) : Chad Ihde Page 1 of 1

It is certified that error appears in the above-identified patent and that said Letters Patent is hereby corrected as shown below:

In the Claims

In Column 14, Line 60, in Claim 6, delete "pro ," and insert --Profile,-- therefor Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*